(12) United States Patent
Bruckmeyer et al.

(10) Patent No.: US 8,594,227 B2
(45) Date of Patent: Nov. 26, 2013

(54) MEASUREMENT OF SYSTEM TIME DELAY

(75) Inventors: Joshua Paul Bruckmeyer, West Melbourne, FL (US); William Walton Boesch, West Melbourne, FL (US); Stephen Joseph Tomko, Palm Bay, FL (US)

(73) Assignee: HBC Solutions, Inc., Englewood, CO (US)

( * ) Notice: Subject to any disclaimer, the term of this patent is extended or adjusted under 35 U.S.C. 154(b) by 673 days.

(21) Appl. No.: 12/759,044

(22) Filed: Apr. 13, 2010

(65) Prior Publication Data

US 2011/0249716 A1    Oct. 13, 2011

(51) Int. Cl.
*H04L 27/04*   (2006.01)
*H04L 27/20*   (2006.01)

(52) U.S. Cl.
USPC ........... 375/295; 375/240; 375/224; 375/265; 375/358

(58) Field of Classification Search
USPC ........................ 375/295, 358, 240, 224, 265
See application file for complete search history.

(56) References Cited

U.S. PATENT DOCUMENTS

| | | | |
|---|---|---|---|
| 4,805,189 A | 2/1989 | Mahoney | |
| 5,751,347 A | 5/1998 | Seccia et al. | |
| 6,351,281 B1 | 2/2002 | Cooper | |
| 6,590,881 B1 | 7/2003 | Wallace et al. | |
| 8,149,817 B2 * | 4/2012 | Simon et al. | 370/350 |
| 2010/0195712 A1 * | 8/2010 | Yu et al. | 375/240.01 |

* cited by examiner

*Primary Examiner* — Qutbuddin Ghulamali
(74) *Attorney, Agent, or Firm* — Tarolli, Sundheim, Covell & Tummino LLP

(57) ABSTRACT

Apparatus and method are presented for measuring the transmitter and antenna system time delay (TAD) of the cadence sync at the input of a conventional 8 VSB data processing system until the emission of the segment sync of the corresponding data frame sync data segment. This includes sequentially conditioning a multi-bit input digital signal containing an initial cadence sync, inserting data patterns into the digital signal, inserting a known data pattern into the data frame at a known position of the data frame and receiving the cadence sync and the known pattern and measuring the time delay therebetween.

14 Claims, 2 Drawing Sheets

MEASUREMENT OF SYSTEM TIME DELAY

TECHNICAL FIELD

The present invention relates to RF communication systems and is particularly directed to systems and methods for measuring the transmitter and antenna system time delay (TAD) between a given cadence sync point at the input of a conventional 8 VSB data processing system until the emission of a leading edge of the segment sync of the corresponding data frame sync data segment. By extension, this method can be applied to systems with deterministic relationship between a point in the digital input data stream and the emitted waveform.

BACKGROUND OF THE INVENTION

High definition television (HDTV) is now being introduced. One aspect is the transmission system known as the Grand Alliance Advanced Television (ATV) system. The transmission system employed is also known as the 8 vestigial sideband (8-VSB) digital transmission system. The ATV VSB transmission system is known and need not be described in detail. By way of background, the 8-VSB system may operate in a broadcast mode with 8-level symbols (3 bits per symbol). Before transmission, data are received serially and randomized, forward-error-corrected (FEC) using a Reed-Solomon coding technique, interleaved and trellis coded. The format for this Transmission Layer signal is a data frame which includes synchronization signals.

A data frame for the Transmission Layer 8-VSB system includes two fields of 312 segments and two field synchronization segments, each of which are 832 symbols long. The first four symbols in each segment are segment synchronization symbols. Subsequent segments convey data formatted in the manner discussed above (randomized and coded). The data segments include the FEC codes. In the 8-VSB format, the field synchronization segments are placed at the beginning of each field (e.g., the first and $314^{th}$ segments of a 626 segment frame).

The ATSC A/110B standard requires the precise measurement of the transmitter and antenna system delay (TAD), which is defined as the time delay from arrival of the cadence sync at the input of the conventional 8 VSB data processing subsystem until transmission of the start of the corresponding data frame sync data segment. The A/110 standard does not provide guidance as to how to physically measure this delay.

The ATSC standard is described in a document A/53 dated Apr. 12, 1995 and Sep. 16, 1995. That document is herein incorporated by reference. Additionally, the prior art includes U.S. Pat. Nos. 6,351,281; 6,590,881; and 4,805,189. These patents do not suggest the subject invention. The first of these patents (U.S. Pat. No. 6,351,281) utilizes a special code on the track signal in order to recognize such signal and ascertain any delays associated therewith. The second patent (U.S. Pat. No. 6,590,881) interrupts its transmissions on all sections for a short interval during which it determines the time of arrival of signals from other base stations. The third patent (U.S. Pat. No. 4,805,189) introduces the use of a matched filter for time measurement.

The prior art also includes U.S. Pat. No. 5,751,347. This last patent, while similar, requires a special receiver for measuring the time.

SUMMARY OF THE INVENTION

In accordance with the present invention, an apparatus is provided for measuring the transmitter and antenna delay (TAD) between a given cadence sync point at the input of a conventional 8 VSB data processing system until the emission of the leading edge of the segment sync of the corresponding data frame sync data segment. This includes a first plurality of signal conditioning units for sequentially conditioning a multi-bit input digital signal containing an initial cadence sync and a second plurality of signal conditioning units. A multiplexer is interposed between the first and second plurality of units for inserting data patterns into the digital signal. A data pattern source stores a known data pattern that is inserted into the data frame at a known position of said data frame by the multiplexer. A measurement unit follows the first and second units and receives the cadence sync and the known pattern and measures the time delay therebetween.

In accordance with another aspect of the invention, a method is provided for measuring the transmitter and antenna system time delay (TAD) between a given cadence sync point at the input of a conventional 8 VSB data processing system until the emission of the segment sync of the corresponding data frame sync data segment. This method includes the steps of sequentially conditioning a multi-bit input digital signal containing an initial cadence sync, inserting data patterns into the digital signal and inserting a known data pattern from a data pattern source into the data frame at a known position of the data frame and receiving the cadence sync and the known pattern and measuring the time delay therebetween.

BRIEF DESCRIPTION OF THE DRAWINGS

The foregoing and other features of the present invention will become apparent to those skilled in the art to which the present invention relates upon consideration of the following description of the invention with reference to the accompanying drawings, wherein.

DESCRIPTION OF PREFERRED EMBODIMENTS

Figure 1:
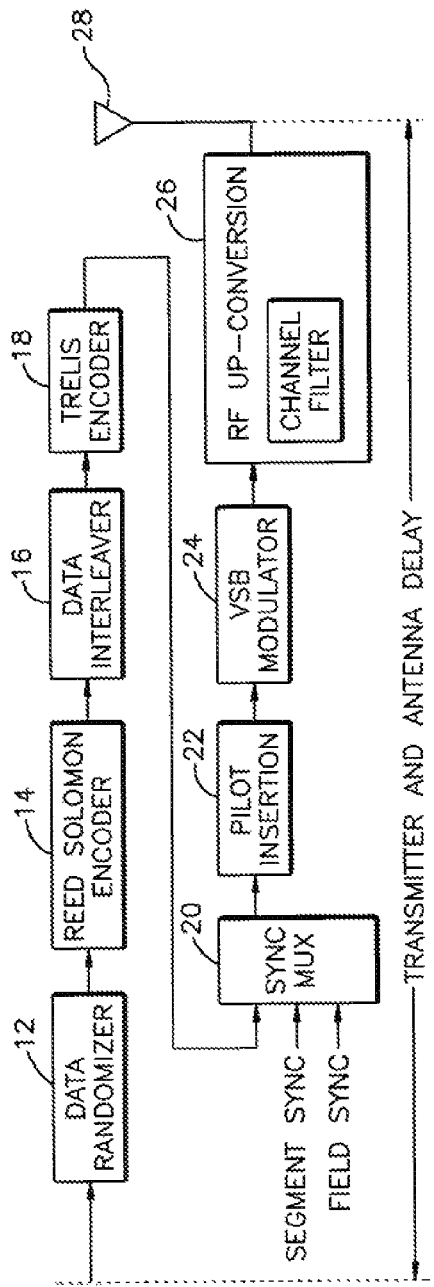
FIG. 1 is a block diagram illustration of a VSB transmitter.
Figure 2:
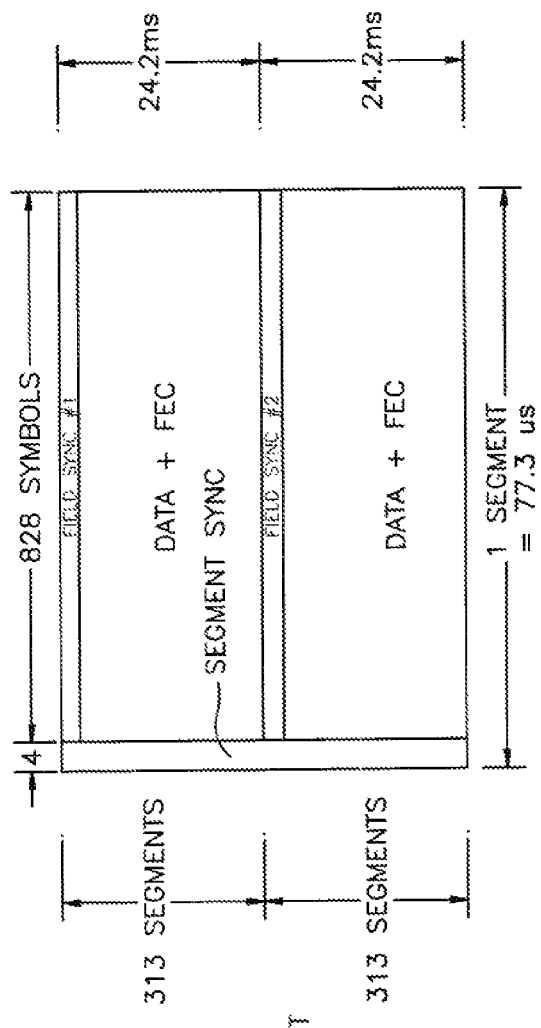
FIG. 2 is a graphical illustration of a VSB data frame.
Figure 3:
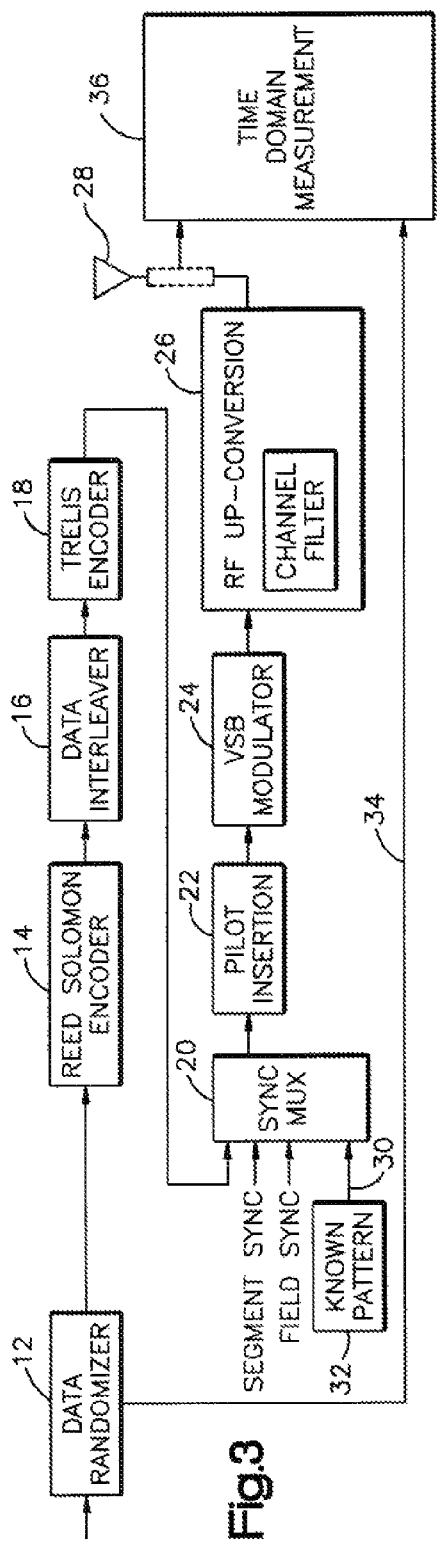
FIG. 3 is a block diagram illustration similar to that of FIG. 1 but illustrated in accordance with the present invention.
Figure 4:
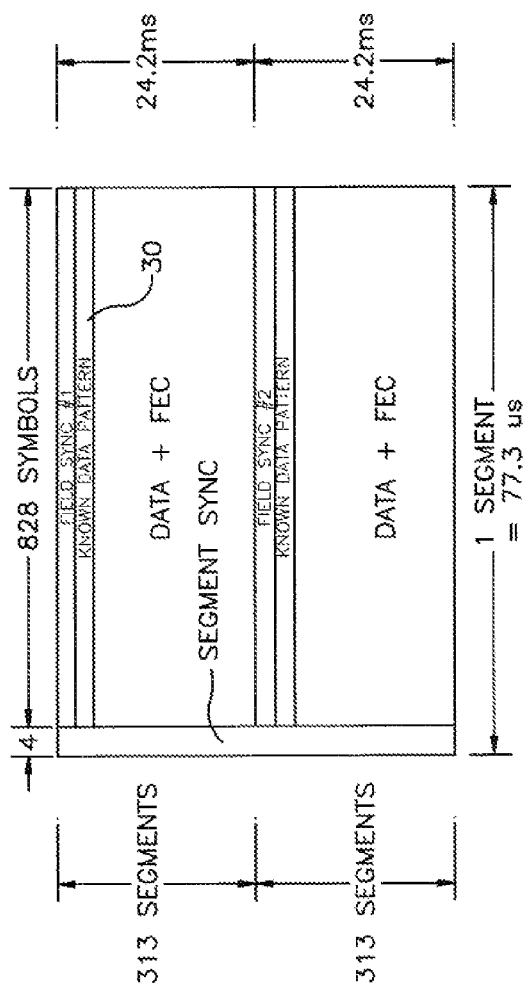
FIG. 4 is similar to FIG. 2 of a VSB data frame which employs the present invention.

Before describing the preferred embodiment illustrated in FIGS. 3 and 4, reference is first made to some background relative to the prior art as illustrated in FIGS. 1 and 2. As shown in FIG. 1, an input signal is provided to a data randomizer 12 where the input signal undergoes a transformation according to known patterns of pseudo-random number generator.

The randomized data is then supplied to a reed solomon encoder 14. This encoder applies a correction to the incoming data stream. The various bytes are mathematically manipulated. All of this is well known in the art.

Thereafter, the encoded signals are supplied to a data interleaver 16 where the data is scrambled and supplied to a trelis encoder 18.

Trelis encoder 18 is another form of forward error correction. These units 12, 14, 16 and 18 may all be considered as signal conditioning units which condition the input data and supply the same into a multiplexer 20 that also receives a segment sync and a field sync. The interleaved data provided by the multiplexer is then supplied to another set of signal conditioning units including a pilot inserter 22. The data is then supplied to a VSB modulator 24 and thereafter supplied to an RF UP converter 26 that includes a channel filter. Data is then supplied to an antenna 28.

Reference is now made to FIG. 2 which illustrates the VSB data frame which is known in the prior art. This data frame includes both a segment sync and a field sync as indicated in the diagram of FIG. 2.

An ATSC Data Field contains 313 data segments. The first data segment of each data field is a unique synchronizing signal, which is known as the data field sync. The remaining 312 data segments each carry the equivalent of the data from one 188 byte transport packet plus its associated RS-FEC overhead. Due to interleaving, the data in each data segment comes from several MPEG transport streams.

The physical ATSC A/110B waveform is vestigial sideband modulation with 8 discrete amplitude levels (8 VSB). This amplitude modulation waveform is susceptible to channel distortion and intersymbol interference and it is difficult to unambiguously measure time delay of the RF waveform.

Reference is now made to FIG. 3 which is similar to that of FIG. 1. The differences between the two is discussed below.

In accordance with the present invention, a known data pattern 30 taken from a known pattern source 32 is inserted into the data stream by way of the multiplexer 20. This is an unambiguous time-domain pattern in the emitted RF waveform. In addition, a discrete signal, known as the cadence sync 34 is generated marking the start of a data segment at the input to the data randomizer. The cadence sync point exists at a location at the boundary between two packets within an MPEG-2 transport stream at which an 8-VSB data frame sync data segment is inserted by the transmitter. The TAD can then be measured as a signal coupler applies the data to a time-domain measurement instrument 36 that determines the time delay between the cadence sync 34 and the known pattern 32. This is all illustrated in FIG. 3.

The VSB data frame is redrawn in FIG. 4 together with the introduction of the known data pattern 30.

Using apriori or estimated knowledge of the channel filter, one can design a matched-filter response for the channel. When this matched-filter response is transmitted through the channel, a single symbol-wide peak can be generated. This matched-filter response can be used as the basis to create a known pattern, however, any known data pattern that produces an unambiguous peak can be used.

Using internal apriori knowledge of the location of the ATSC field sync within the data stream, one can replace an ATSC data segment with the known pattern at a known location in the frame. To minimize the impact to the receiver, and to maintain channel bandwidth, the known signal is inserted at the sync MUX 20 at a point in the frame other than the field sync.

One can generate a discrete signal that marks the cadence sync at the entrance of the data randomizer 12. Using a time domain measurement device, such as an oscilloscope, one can measure the delay between the cadence sync 34 and the RF peak caused by the known pattern 30. By removing the apriori known delay of the RF peak from the start of the corresponding data frame sync data segment, one can measure the TAD.

From the above description of the invention, those skilled in the art will perceive improvement, changes and modifications in the invention. Such improvements, changes and modifications within the skill of the art are intended to be covered by the appended claims.

Having described the invention, we claim:

1. An apparatus for measuring a transmitter and antenna system time delay (TAD) between a given cadence sync point and a known data pattern, comprising:

a first plurality of signal conditioning units for sequentially conditioning a multi-bit input digital signal containing an initial cadence sync;

a second plurality of signal conditioning units;

a multiplexer interposed between said first and second plurality of signal conditioning units;

a data pattern source storing the known data pattern selected to provide an unambiguous peak in a time domain, the known data pattern being inserted into a data frame at a known position of the data frame independent of a field sync of said digital signal by said multiplexer; and a time domain measurement device following said first and second signal conditioning units that receives said cadence sync and the unambiguous peak provided by said known data pattern in the time domain and measures the time delay there between.

2. The apparatus as set forth in claim 1 wherein said time domain measurement device has a similar function to an oscilloscope.

3. The apparatus as set forth in claim 1 wherein said first plurality of signal conditioning units includes a data randomizer.

4. The apparatus as set forth in claim 1 wherein said first plurality of units includes a reed solomon encoder.

5. The apparatus as set forth in claim 1 wherein said first plurality of units includes a data interleaver.

6. The apparatus as set forth in claim 1 wherein said first plurality of units includes a trelis encoder.

7. The apparatus as set forth in claim 1 wherein said first plurality of units includes a data randomizer, a reed solomon encoder, a data interleaver and a trellis encoder.

8. The apparatus as set forth in claim 1 wherein said second plurality of signal conditioning units includes a pilot insertion unit.

9. The apparatus as set forth in claim 1 wherein said second plurality of units includes a VSB modulator.

10. The apparatus as set forth in claim 1 wherein said second plurality of units includes an RF up conversion unit.

11. The apparatus as set forth in claim 1 wherein said second plurality of units includes a pilot insertion unit, a VSB modulator and an RF up-conversion unit.

12. A method for measuring the transmitter and antenna system time delay (TAD) between a given cadence sync point and a known data pattern, comprising the steps of:

sequentially conditioning a multi-bit input digital signal containing an initial cadence sync at a plurality of signal conditioning units;

inserting, at a multiplexer, the known data pattern from a data pattern source into said a data frame of said digital signal at a known position of said data frame independent of a field sync, the known data pattern being selected to provide an unambiguous peak in a time domain; and measuring a time delay between the cadence sync and the unambiguous peak provided by the known data pattern in the time domain at a time domain measurement device.

13. The method as set forth in claim 12 wherein said step of inserting a known data pattern includes inserting said known data pattern into said data frame by multiplexing.

14. The method as set forth in claim 12 wherein said measuring a time delay includes utilizing a measurement unit with a similar function to an oscilloscope.

* * * * *